United States Patent [19]

McMullen

[11] 4,321,150
[45] Mar. 23, 1982

[54] PROCESS FOR WASTEWATER TREATMENT AND WASTEWATER SLUDGE CONVERSION INTO ENERGY

[76] Inventor: Frederick G. McMullen, 1313 Gypsy Hill Rd., Ambler, Pa. 19002

[21] Appl. No.: 101,128

[22] Filed: Dec. 7, 1979

[51] Int. Cl.³ .............................................. C02F 11/12
[52] U.S. Cl. .................................... 210/769; 210/771; 210/806
[58] Field of Search ................ 210/609, 761, 768–771, 210/774, 806

[56] References Cited

U.S. PATENT DOCUMENTS

| | | | |
|---|---|---|---|
| 3,549,010 | 12/1970 | Marsh et al. | 210/769 X |
| 3,549,529 | 12/1970 | Wiseman | 210/761 |
| 3,887,461 | 6/1975 | Nickerson et al. | 210/769 X |
| 4,165,289 | 8/1979 | Borst | 210/769 X |

Primary Examiner—Thomas G. Wyse
Attorney, Agent, or Firm—Anthony F. Cuoco

[57] ABSTRACT

The process disclosed includes treating settled sludge and/or organic debris recovered from a wastewater treatment system and thermally converting the treated material and/or comminuted organic solid wastes separately or in combination into steam combustible gas, residual tars and oils and other energy by-products which are recycled as heat for increasing the thermodynamic efficiency of the process. The process further includes cleaning the combustible gas which is provided during the thermal conversion so that the gas is suitable for driving gas engine or gas turbine generators and the like.

4 Claims, 2 Drawing Figures

PROCESS FOR WASTEWATER TREATMENT AND WASTEWATER SLUDGE CONVERSION INTO ENERGY

FIELD OF THE INVENTION

This invention relates generally to a process for wastewater treatment and conversion of waste-water sludge and/or organic debris into energy by the early interception and controlled withdrawal from the wastewater treatment system of the raw settled sludge and debris, regardless of the level of wastewater treatment, i.e., primary, secondary or tertiary. Early withdrawal of the primary and, when necessary, the secondary material not only preserves the high calorific value thereof but permits an increase in the system capacity for every gallon of sludge withdrawn.

More particularly this invention relates to dewatering, drying and pyrolyzing of the sludge alone or in combination with organic debris and/or solid waste to produce energy by-products for recycling, including a combustible gas that after cleaning, compressing and drying is suitable for storing as an energy source.

DESCRIPTION OF THE PRIOR ART

Prior to the present invention, treated wastewater sludge and/or organic debris has been placed in drying beds, used as landfill, incinerated, dumped in the ocean or otherwise disposed of, without regard to, or recognition of, the recoverable energy potential of the material prior to decomposition. For example, conventional primary and secondary wastewater treatment plants produce settled sludges of varying degrees of solids content.

When only primary treatment is involved, the sludge has about five percent solid material and a sludge digester is frequently incorporated, operating on the anaerobic principle (in the absence of oxygen) and requiring as long as sixty days to complete the digestion cycle.

When secondary treatment is involved, an activated sludge process is most widely used. This process aerobically (in the presence of oxygen) reduces the raw sewage quickly and safely (non-explosive) as contrasted to the anaerobic process as employed for primary treatment.

Further treatment of sludge beyond the secondary level is defined as tertiary treatment. Here, a number of processes are available to remove from secondary effluents BOD (biochemical oxygen demand) and solids in suspension in the ninety-nine percent range, as well as phosphates and other compounds including disolved inorganic materials.

In each of the aforenoted treatment levels, the sludge is reduced basically to an inert material, possessing little calorific or energy value. The present invention is an improvement over the prior art in that a process is provided for the controlled withdrawal of raw settled sludge and/or organic debris early in the treatment phase and prior to digestion, so as to preserve its high calorific content. Furthermore the wastewater treatment system capacity is increased by every gallon of material that is so withdrawn.

SUMMARY OF THE INVENTION

This invention comtemplates a process for wastewater treatment and wastewater sludge conversion into energy whereby, regardless of the level of the applied wastewater treatment, all raw settled sludge is periodically retrieved from the system well in advance of digestion thereby preserving the high calorific value, on a dry basis, of the sludge.

The raw settled sludge is stored in a suitable holding tank, gently agitated and continuously withdrawn after which it is dewatered to a filter cake consistency. The filter cake is continuously fragmented to a particle size that readily lends itself to mixing, flash drying and pyrolyzing in a combination boiler-pyrolyzer or a refractory furnace to produce a combustible gas.

Alternatively, the filter cake may be continuously fragmented and mixed with comminuted solid organic materials with the mixture dried and pyrolyzed in a similar manner. Further a portion of the mixture may be blended with the pyrolytic by-product tar, oil and char, and pelletized to form a high calorific fuel for combustion in the aforementioned boiler-pyrolyzer. Thus, using one fuel source, after initial start-up, the boiler-pyrolyzer produces superheated steam and a combustible gas simultaneously so as to be capable of providing the motive force for powering, for example, a steam or gas turbine driven grinding unit.

Low pressure exhaust steam, when using a steam turbine driven grinding unit, is diverted for reheating to the high temperature zone of the boiler-pyrolyzer for use as a heat transfer media in a steam dryer or other type drying unit. Condensed steam from the drying operation is pumped to a boiler feed water heater as a contribution to the feed water supply of the boiler-pyrolyzer. Thus, with the addition of recirculated cooling water, preheated by the cooling down of the carbon-residual produced by pyrolysis, all possible waste heat produced from the process is recovered and utilized to advantage.

A further energy source is provided by the collection and processing, in a manner similar to that aforementioned, of the sewage grits (organic debris) that are continuously recovered from the wastewater treatment system.

The combustible gas produced by pyrolysis is collectively diverted for cleanup to a "Chemical Train" including a water type scrubbing device (hydraulic main), shell and tube heat exchangers and demisters, whereby the tar and oil particles entrained in the gas are continuously removed. Upon decanting the residual tar and oil removed from the gas, it is continuously introduced into the combustion zone of the boiler-pyrolyzer, furnishing supplementary heat and thereby eliminating the use of other fossil fuels. The recovered wastewater is continuously recycled as scrubbing media to the hydraulic main.

The temperature of the pyrolytic gas prior to cleanup is relatively high (about 900° F.). Initial scrubbing and condensing operations greatly reduce this temperature to about 100°–150° F., after which submicron aerosol particles of fine oil mist are removed. The clean gas is then compressed at about 80 psi, dried and stored for powering gas engine or turbo-electric generating equipment.

DETAILED DESCRIPTION OF THE INVENTION

Figure 1:
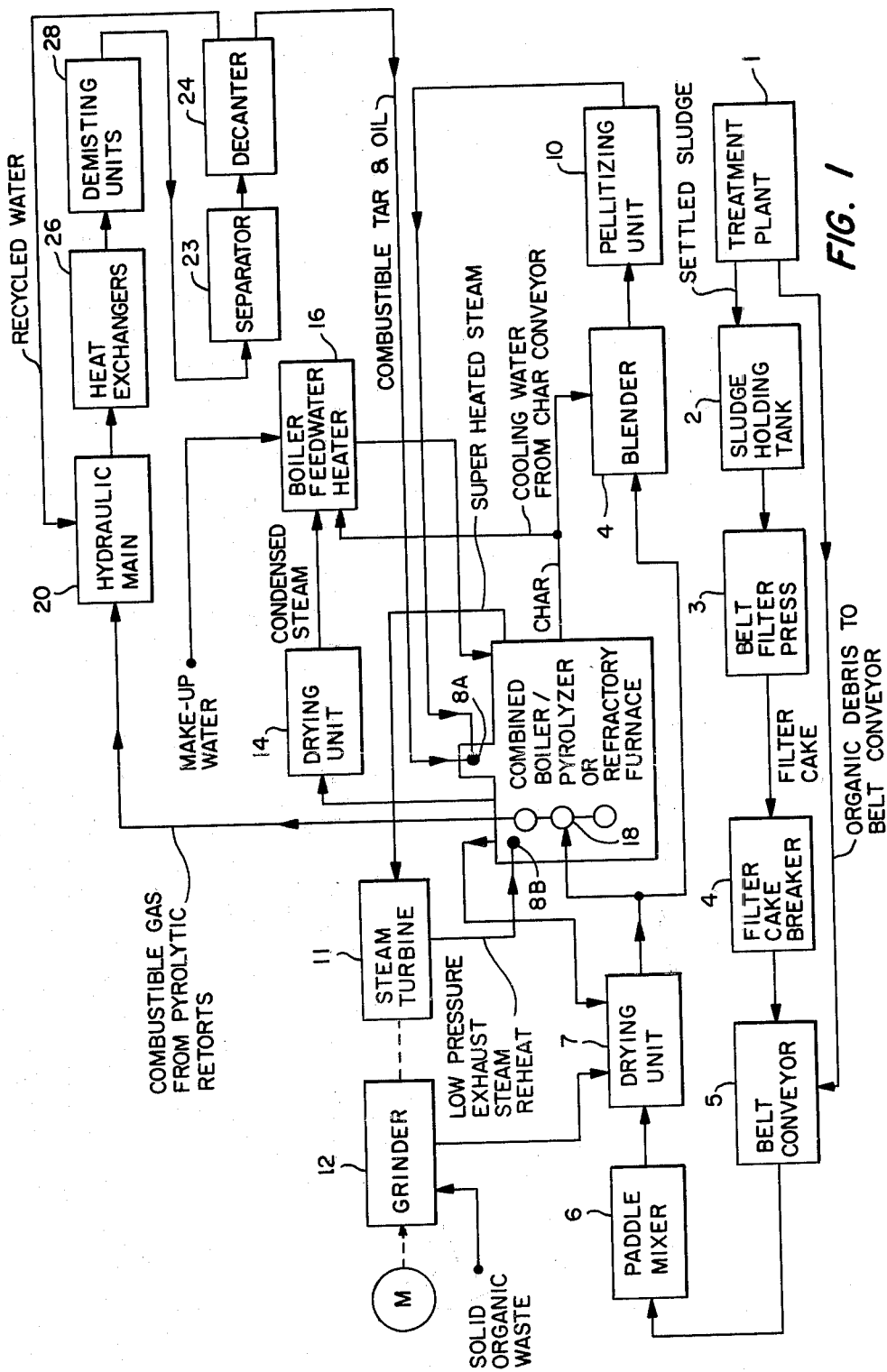
FIG. 1 is a flow diagram illustrating the implementation of the innovative process of the invention for wastewater treatment and sludge conversion into energy.

Referring first to FIG. 1, a conventional wastewater treatment plant is designated generally by the numeral 1, and from which plant all raw settled sludge and organic debris is periodically withdrawn. It is noted at the outset that retrieval of the settled sludge occurs well in advance of digestion of same, thereby preserving the high calorific value (7,000 to 17,000 BTU per pound on a dry basis, for example) of this material.

The raw settled sludge, containing about five percent solid material, is then pumped directly to a prefabricated 50,000 gallon capacity, elevated, all steel, sludge holding tank 2 containing a 15 HP vertical, propeller type agitator. The agitator may be, for example, of the type manufactured by the Philadelphia Mixers Corporation, King of Prussia, Pennsylvania, and is mounted within the tank so as to gently turbulate the liquid waste, permitting continuous unrestricted pumped withdrawal to a dual, belt-filter press 3. Belt filter press 3 may be, for example, the Model MP-40 unit as manufactured by the Parkson Corp., Fort Lauderdale, Florida, for dewatering the retrieved material to a consistency of about thirty-five percent solids and producing a filter cake having about sixty-seventy percent moisture content and a thickness of about ⅛ to 3/16 inches.

A 1/5 HP motor driven rotary type cake breaker 4 which may be, for example, of the type manufactured by the aforenoted Parkson Corporation, and including rotating L-shaped breaker arms, rapidly fragments the filter cake as it discharges from belt filter press 3.

The filter cake fragments so provided are guided by an inclined chute downwardly, depositing onto an inclined eighteen inch wide, covered, flat belt conveyor 5 which may be, for example, of a conventional type, such as manufactured by Beaumont Birch Co., Pennsauken, New Jersey. Filter cake fragments discharge from the belt conveyor into a double-paddle rotary mixer 6 which may be for example, of the type manufactured by C. E. Raymond Corporation, a subsidiary of Combustion Engineering, Inc., Windsor, Connecticut.

Upon completion of the mixing of the fragmented filter cake along or, alternatively, a mixture of a proportionate amount, for example, of fragmented filter cake and of comminuted solid organic waste material, the mixture is charged into a rotary steam drum, inert gas or hot air type drying unit 7 which may be, for example, of the type manufactured by Link-Belt Division, EMC Corporation, Chicago, Illinois, or alternatively, a flash drying system such as manufactured by the aforenoted G. E. Raymond Corporation. Dried feed stock (10-15 percent moisture content) from unit 7 is then conveyed pneumatically for pyrolyzing to a combination boiler-pyrolyzer 8 which may be, for example, a unit such as manufactured by Parkinson-Cowan GWB Ltd., Dudley, England ( or other type refractory furnace), and a proportionate amount is conveyed to a rotary mixing device or blender 9 such as manufactured by the aforenoted Link-Belt Division, for blending with the residual tar, oil and char (pyrolysis by-products) produced by pyrolysis of the mixed and dried feed stock. In this connection, it is noted that the boiler-pyrolyzer referred to above is described in U.S. Pat. No. 3,769,921 issued on Nov. 6, 1973 to Frederick G. McMullen, and which patent is incorporated herein by reference.

Upon completion of the blending operation, the blended stock is directed to a pelletizing unit 10 which may be, for example, of the type manufactured by the Sprout Waldron Co., (a subdivision of Combustion Engineering, Inc.). Pellets about one inch in diameter by one and one half inches long, for example, are pneumatically conveyed for charging the combustion zone 8A of boiler-pyrolyzer 8.

Thus, using one fuel source, after initial start-up, the boiler-pyrolyzer produces a superheated steam and a combustible gas simultaneously, and has the capability of providing the motive force for powering a dual steam turbine 11-motor driven solid waste grinding unit 12. The dual unit 11-12 may be, for example, the Model No. 26HD44 unit such as manufactured by the Jacksonville Blo-Pipe Co., Jacksonville, Florida.

Low pressure exhaust steam from the dual turbine motor driven grinding unit is diverted for reheating to the high temperature zone 8B of boiler pyrolyzer 8 for use as heat transfer media in a steam dryer or other type of drying unit 14. Condensed steam from the drying operation is pumped to a boiler feed water heater 16 which may be, for example, of the type manufactured by the Cochran Corp., Philadelphia, Pennsylvania, as a contribution to the feed water supply to boiler-pyrolyzer 8. Thus, with the addition of recirculated cooling water, preheated by the cooling down of the carbon-residual produced by pyrolysis, all possible waste heat produced from the process is recovered and utilized to advantage.

A further energy source is provided by the collection, processing and utilization of the sewage grits (organic debris) that are continuously retrieved from the grit collection chamber of wastewater treatment plant 1, and which are produced, for example, at the rate of about two cubic meters on a daily basis. When dewatered and pulverized as aforenoted for the settled wastewater sludge, and introduced as feed stock into boiler-pyrolyzer 8 this material has a calorific value of approximately 7,000 BTU per pound on a dry basis and carbonizes readily to produce a combustible gas of similar quality and quantity as the combustible gas produced by pyrolyzing the settled sludge.

All feed stock, when properly reduced to a particulate size ranging approximately from one-eighth to one and one-half inches, is continuously metered into metallic retorts 18 included in boiler-pyrolyzer 8, and which are of the horizontal type varying in diameter from seven to ten inches inside diameter. The retorts are of a high temperature alloy material such as, for example, Incalloy 800 steel, a suitable ceramic, or other material capable of withstanding operating temperatures of approximately 1800°-2000° F. Suitable stuffing boxes (not shown) are mounted at opposite ends of the retorts to preserve a starved for oxygen atmosphere maintained within the retorts during pyrolysis.

The gas produced by the pyrolysis of the feedstock is collectively diverted for cleanup to a "Chemical Train" including a water type scrubbing device designated as a "hydraulic main" 20, dual shell and tube heat exchangers 26 and dual demisting units 28. The heat exchangers and demisting units are arranged to operate in pairs as part of the chemical train. Hydraulic main 20 is fabricated of carbon steel piping, as for example, eighteen inches in diameter and eight feet long, with four staggered opposing solid spray nozzles mounted at the ten and two o'clock positions on the perimeter of the eighteen inch diameter. Thus, clean spray water is continuously supplied at the rate of fifty GPM at about 0.50" w.c. Tar and oil particles entrained in the gas are thus quickly removed as the gas is evoluted.

The residual tar, oil and other particulate captured in the reservoir of the hydraulic main, the heat exchangers and demisters finds its way by gravity flow to a Lancy Corrugated Plate Seperator 23 which may be of the type manufactured by the Lancy Systems Div. of Dart Environs and Services Co., St. Paul, Minnesota. When properly decanted, as by a conventional decanter 24, the combustible tar and oil is continuously introduced into the combustion zone 8A of boiler-pyrolyzer 8 (or other type furnace), furnishing supplementary heat to offset the use of other fossil fuels. The recovered wastewater is continuously recycled as scrubbing media to hydraulic main 20.

Figure 2:
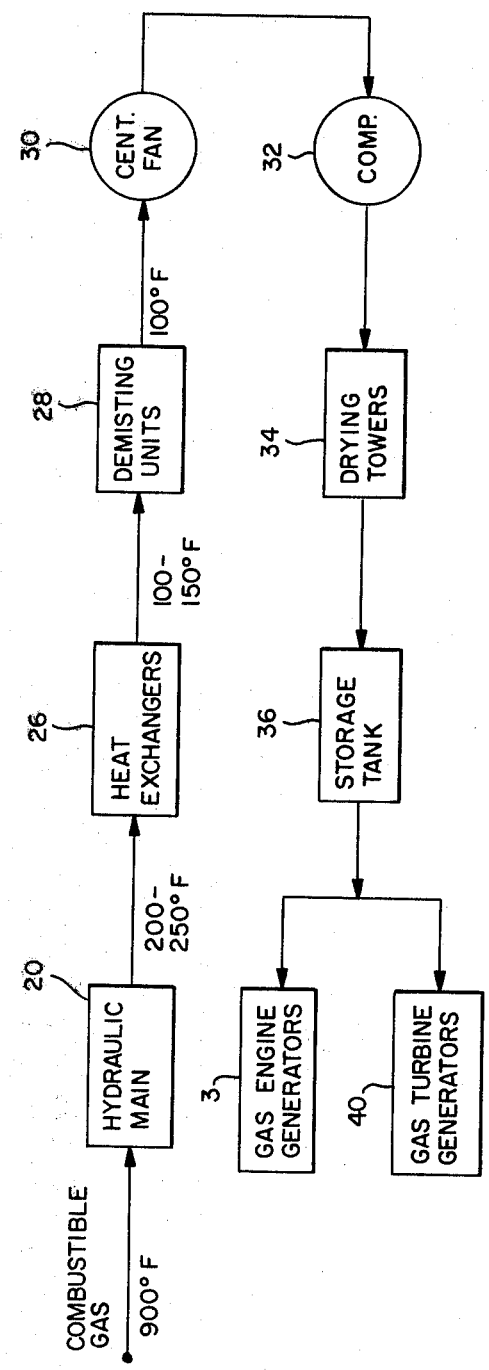
FIG. 2 is a flow diagram illustrating a "chemical train" used for cleaning up the combustible gas produced by the process of the invention.

With reference now to FIG. 2, the temperature of the gas entering hydraulic main 20 is approximately 900° F. After scrubbing, as aforenoted, the gas temperature is approximately 200°–250° F. Further cooling is achieved by alternating the dual arrangement of shell and tube vertical type heat exchangers 26, through which tubes cooling water (60°–68° F.) is circulated in counterflow to the gas flow on the shell side of the unit. The exchangers may be of the Type "O" Model No. 14-10 gas coolers manufactured by the Patterson-Kelly Corp., Stroudsburg, Pennsylvania. Leaving temperature of the gas from the exchangers is approximately 100°–150° F.

Provision is made for spray cleaning the shell side of the heat exchanger tubes of tar and oil particles that may have escaped the scrubbing action of the hydraulic main. Also, the removal of sub-micron aerosol particles of fine oil mist that may still remain in the gas is accomplished by the dual arrangement of demisting units 28 including, for example, six inch diameter ductile iron flanged pipe fittings devised to create scrubbing columns containing not less than eighteen inches of microscreen packing with provision for periodic cleaning by water sprays. Leaving temperature of the upward flowing gas from demisting unit 28 is about 100° F.

At this point, a centrifugal type induced draft fan 30 moves about 140 SCFM of gas at about atmospheric pressure to, for example, a Model No. HBB Worthington Corporation single-stage horizontal non-lubricatad compressor 32 including an after cooler from which the leaving gas at about eighty psig enters alternating gas drying towers 34, each containing Silica Gel dessicant, grade (03) as manufactured by Davison Chemical Div., Baltimore, Maryland. The gas drying towers which may be, for example, of the type designated as No. 75U as manufactured by C. M. Kemp Mfg. Co., Glen Burnie, Maryland, use embedded electric reactivator heaters to assure a consistent dry, low (−100° F.) dew point gas. The pressurized gas is then stored in an ASME design vertical type, prefabricated steel Receiver or storage tank 36, sixty inches in diameter by twenty four feet high, also manufactured by the C. M. Kemp Mfg. Co. heretofore referred to.

The dry, low dew point gas is supplied at constant temperature and pressure of about fifteen paig to, for example, duel 255 KW gas engine generators 38 as manufactured by White Motor Co., Minneapolis, Minnesota, or dual 350 kw gas turbine generators 40 as manufactured by Onan, Inc., Springfield, Ohio.

OPERATION OF THE INVENTION

Having checked out all electrical and mechanical controls and instrumentation associated with the equipment described with reference to FIGS. 1 and 2, as well as the functional operation of the equipment, the first step in the process of the invention is to slowly bring boiler-pyrolyzer 8 to a thermal equilibrium, steady state condition at 2000° F. At the same time, all fuel oil burners are energized, all pyrolyzer retorts are activated.

In this connection it is noted that a refractory furnace (a non-steam producer) may be employed in lieu of the described boiler-pyrolyzer for the purposes intended as will be understood by those skilled in the art. In this event, dampers in start-up stack breaching are gradually opened, while those in the furnace exhaust breaching are fully closed, permitting the establishing of the aforementioned thermal equilibrium steady state condition in the furnace.

When the boiler-pyrolyzer (or refractory furnace) reaches the equilibrium temperature, all equipment is energized in the following sequence:
 (a) belt filter press 3
 (b) filter cake breaker 4
 (c) mixer 6
 (d) drying unit 7
 (e) boiler-pyrolyzer components The "Chemical Train" components are next activated in the following sequence:
 (a) hydraulic main 20
 (b) heat exchangers 26
 (c) demisting units 28
 (d) centrifugal fan 30
 (e) compressor 32
 (f) drying towers 34
 (g) storage tank 36
 (h) gas engine or gas turbine generators 38, 40

When all of the above equipment has been energized, the agitator in sludge holding tank 2 is activated prior to opening the sludge holding tank motorized discharge valve. All organic debris (sewage grit) and/or other organic materials (as for example, solid waste, processing and particle size reduction equipment is used only when enough material has been accumulated to warrant retrieval of same.

Automation and monitoring of the entire process of the invention is accomplished from a centrally located console, from which point the system operator can control each component of equipment including monitoring of thermal conditions through thermocouple sensors at stretegic points of the process cycle, as will now be understood by those skilled in the art.

Since the pyrolyzer retorts were among the first elements to be activated, all dewatered and dried sludge (10–15 percent moisture content) and/or other organic debris is continuously converted to a combustible gas upon passing through the retorts. The resultant residual carbon (char) is recycled to the boiler-pyrolyzer (or refractory furnace) as described and serves the purpose of a supplemental fuel, or, for example, may be diverted for use as a filter media or as the source of recovery of precious metals as will be understood by those skilled in the art.

It is further noted that the invention has been described in terms of using steam produced from pyrolysis. There are situations that do not afford an advantageous opportunity to use steam and in these cases a refractory furnace which simulates the combustion zone of the pyrolyzer, but does not include associated water jacketing may be employed instead of the boiler-pyrolyzer as has been heretofore referred to.

What is claimed is:

1. A process for treating wastewater settled sludge and for utilizing the products of the treatment, comprising:

periodically retrieving the wastewater settled sludge in advance of the digestion thereof and thereby preserving the high calorific value of the sludge;

storing and agitating the retrieved settled sludge;

withdrawing and dewatering the stored and agitated settled sludge for producing a filter cake therefrom;

fragmenting the filter cake;

mixing the fragmented filter cake and providing a mixture;

drying the mixture;

decomposing the dried mixture by heating the mixture and thereby evoluting a combustible gas and a residual char, including decomposing a portion of the dried mixture by heating and thereby producing the residual char; utilizing the residual char, including blending another portion of the dried mixture with the residual char, pelletizing the blended dried mixture and residual char, and utilizing the pellets from the pelletizing as an energy source for decomposing the dried mixture by heating;

cleaning the combustible gas to remove residual contaminates therefrom;

utilizing the clean gas; and utilizing the residual contaminates.

2. A process as described by claim 1, wherein mixing the fragmented filter cake and providing a mixture includes:

mixing the fragmented filter cake with comminuted solid organic wastes.

3. A process as described by claim 1, including:

combusting the dried mixture to produce superheated steam; and utilizing the superheated steam as an energy source for comminuting the solid organic waste.

4. A process as described by claim 3, including:

generating a low pressure exhaust steam upon comminuting the solid organic waste;

reheating the low pressure exhaust steam;

utilizing the reheated low pressure exhaust steam for drying purposes and for thereby condensing the steam;

recirculating the condensed steam through a feedwater heater; and circulating the heated feedwater through a dried mixture decomposing unit.

* * * * *